US009290596B2

(12) United States Patent
Brown et al.

(10) Patent No.: US 9,290,596 B2
(45) Date of Patent: *Mar. 22, 2016

(54) SOLVENT-BASED FLUOROPOLYMER ADDITIVES AND THEIR USE IN COATING COMPOSITIONS

(75) Inventors: Gerald Oronde Brown, Wilmington, DE (US); Xianjun Meng, Hockessin, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 557 days.

This patent is subject to a terminal disclaimer.

(21) Appl. No.: 12/789,059

(22) Filed: May 27, 2010

(65) Prior Publication Data

US 2011/0293949 A1 Dec. 1, 2011

(51) Int. Cl.
*C08L 33/16* (2006.01)
*C08F 220/18* (2006.01)
*C09D 167/08* (2006.01)

(52) U.S. Cl.
CPC ............ *C08F 220/18* (2013.01); *C09D 167/08* (2013.01); *C08F 2220/1858* (2013.01); *Y10T 428/3179* (2015.04); *Y10T 428/31551* (2015.04); *Y10T 428/31591* (2015.04); *Y10T 428/31598* (2015.04); *Y10T 428/31605* (2015.04); *Y10T 428/31678* (2015.04); *Y10T 428/31681* (2015.04); *Y10T 428/31989* (2015.04); *Y10T 428/31993* (2015.04); *Y10T 428/31996* (2015.04)

(58) Field of Classification Search
CPC ..................................................... C08L 33/16
USPC .................... 524/539, 544; 526/245; 525/199
See application file for complete search history.

(56) References Cited

U.S. PATENT DOCUMENTS

| | | | |
|---|---|---|---|
| 3,920,614 A | 11/1975 | Kirimoto et al. | |
| 3,950,298 A * | 4/1976 | McCown et al. | 524/544 |
| 4,810,411 A | 3/1989 | Del Pesco et al. | |
| 5,055,538 A * | 10/1991 | Amimoto et al. | 526/245 |
| 5,270,378 A * | 12/1993 | Johnson et al. | 524/520 |
| 5,284,902 A | 2/1994 | Huber et al. | |
| 5,344,903 A | 9/1994 | Raiford et al. | |
| 5,859,126 A | 1/1999 | Anton et al. | |
| 5,929,158 A * | 7/1999 | Matsuno et al. | 524/520 |
| 5,948,851 A | 9/1999 | Anton et al. | |
| 6,004,735 A | 12/1999 | Schell et al. | |
| 6,777,059 B2 | 8/2004 | Kurian et al. | |
| 6,964,987 B1 | 11/2005 | Auguste et al. | |
| 7,258,925 B2 | 8/2007 | Franchina et al. | |
| 7,820,745 B2 | 10/2010 | Kashiwagi | |
| 8,680,223 B2 | 3/2014 | Jin et al. | |
| 2003/0175522 A1 | 9/2003 | Kurian et al. | |
| 2005/0027063 A1 | 2/2005 | Audenaert et al. | |
| 2008/0146758 A1 | 6/2008 | Murphy et al. | |
| 2008/0275157 A1 | 11/2008 | Luciano et al. | |
| 2009/0030114 A1 | 1/2009 | Wang et al. | |
| 2009/0117795 A1 | 5/2009 | Murphy et al. | |
| 2010/0068515 A1 | 3/2010 | Paul et al. | |
| 2010/0069564 A1 * | 3/2010 | Shimada et al. | 524/544 |
| 2011/0009555 A1 * | 1/2011 | Kurihara et al. | 524/544 |
| 2011/0111659 A1 | 5/2011 | Brown et al. | |

FOREIGN PATENT DOCUMENTS

| | | | |
|---|---|---|---|
| JP | 55012135 A * | 1/1980 | |
| JP | 2004 114620 A | 4/2004 | |
| JP | 2005054020 | 3/2005 | |
| JP | 2010106240 A * | 5/2010 | |
| WO | 00/53676 A1 | 9/2000 | |
| WO | 0216517 A2 | 2/2002 | |
| WO | 03083205 A1 | 10/2003 | |
| WO | 2005105872 A1 | 11/2005 | |
| WO | 2006116222 A2 | 11/2006 | |
| WO | WO 2008022985 A1 * | 2/2008 | |
| WO | 2008076161 A1 | 6/2008 | |
| WO | 2009015136 A1 | 1/2009 | |
| WO | 2010002557 A1 | 1/2010 | |

OTHER PUBLICATIONS

Machine translation of JP 2010-106240 A, date unknown.*
International Search Report, European Patent Office, Rijswijk NL in PCT/2011/038034, PCT Counterpart of present U.S. Appl. No. 12/789,059; Didier Baekelmans, Authorized Officer, Feb. 9, 2011.
Honda et al., Molecular Aggregation Structure and Surface Properties of Poly(fluoroalkyl acrylate) Thin Films, Macromolecules, 2005, 5699-5705, 38, Kyushu University, Japan.
Cameron et al., Preparation and Glass Transition Temperatures of elastomeric PolyHIPE Materials, J. Mater. Chem, 1997, 2209-2212, 7 (11), Glasgow, UK.
Full translation of JP2010106240, which patent application was published May 13, 2010, and translation was received Oct. 20, 2015.

* cited by examiner

*Primary Examiner* — Nicole M Buie-Hatcher

(57) ABSTRACT

This invention relates to a composition comprising a solvent-based fluoropolymer and its use as a coating additive, and a coating composition comprising the fluoropolymer. The coating composition comprising the solvent-based fluoropolymer provides desirable properties including uniform spreading, and cleanability and increased contact angle to a coated substrate. There is further provided a method of treating a substrate using the coating composition.

11 Claims, No Drawings

SOLVENT-BASED FLUOROPOLYMER ADDITIVES AND THEIR USE IN COATING COMPOSITIONS

FIELD OF THE INVENTION

This invention relates to a composition comprising a fluoropolymer and its use as an additive to coating compositions such as alkyd paints or polymeric resins, to provide durable surface effects.

BACKGROUND OF THE INVENTION

Fluoroalkyl(meth)acrylate copolymers have been used in aqueous emulsions as in textile fabric treatment processes to provide coatings which impart desirable properties such as high levels of water-, alcohol-, and oil repellency to the fabrics. Aqueous emulsions of such fluoroalkyl (meth)acrylates copolymers, as disclosed in U.S. Pat. No. 5,344,903 are require an additional heat-cure step after application in order to impart the desired repellency traits to the fibers.

Fluorinated polymer compositions are used in the preparation of a wide variety of surface treatment materials to provide surface effects to substrates. Many such compositions are fluorinated acrylate polymers or copolymers which contain predominantly eight or more carbons in the perfluoroalkyl chain to provide the desired properties. Honda, et al., in *Macromolecules*, 2005, 38, 5699-5705 teach that for perfluoroalkyl chains of greater than 8 carbons, orientation of the perfluoroalkyl groups, designated $R_f$ groups, is maintained in a parallel configuration while for such chains having 6 or less carbons, reorientation occurs. This reorientation is recited to decrease surface properties such as contact angle. Thus, polymers containing shorter perfluoroalkyl chains have traditionally not been commercially successful.

Alternatively, solvent-based polymer systems, particularly for alkyd coating and urethane coating compositions, do not require such a heat-cure step after application. However, alkyd and urethane coatings produced using solvent-based polymer systems have a tendency to be non-uniform and uneven after drying (air-cure), have low oil-contact angles, and poor cleanability ratings. Attempts have been made to overcome the problem of lack of evenness/uniformity, and to increase the cleanability and oil- and water-repellency of these types of coatings by the addition of a variety of surfactants and other compounds.

The present invention addresses the issues described above by introducing compositions comprised of solvent-based fluoroalkyl (meth)acrylate copolymers with short perfluoroalkyl groups of 6 or less carbons. They are utilized as coating additives and impart unexpectedly desirable surface effects such as: uniform spreading, increased water and oil contact angles, enhanced cleanability to the coated film and air-cured coated surface.

SUMMARY OF THE INVENTION

The present invention provides a fluoropolymer composition that is useful as a coating additive comprising a fluoropolymer and a solvent, wherein the fluoropolymer comprises repeating units in any sequence of the following:

$[R_f-X-Y-C(O)-CZ-CH_2]_a-$  I:

$[R_f-X-Y-C(O)-CH-CH_2]_b-$  II:

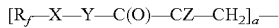  III:

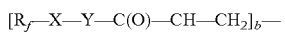

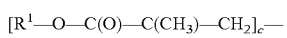

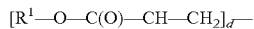  IV:

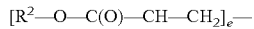  V:

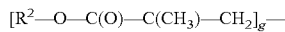  VI:

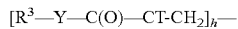  VII:

wherein $R_f$ is a straight or branched perfluoroalkyl group having 2-6 carbon atoms, which is optionally interrupted by at least one oxygen atom, or a mixture thereof of two or more thereof;

X is an organic divalent linking group having from about 1 to about 20 carbon atoms, optionally containing a triazole, oxygen, nitrogen, or sulfur, or a combination thereof;

Y is O, S or N(R) wherein R is H or $C_1$ to $C_{20}$ alkyl;

Z is a straight or branched alkyl group having from about 1 to about 4 carbon atoms, or halide;

$R^1$ is a straight or branched alkyl group having from 12 to 22 carbon atoms;

$R^2$ is an alkyl group having a chain length of from 1 to 6 carbon atoms, which carbon chain may branched;

a is a positive integer;
b is zero or a positive integer;
c is a positive integer;
d is zero or a positive integer;
e is zero or a positive integer;
g is a positive integer;
h is zero or a positive integer;

T is H, a straight, branched or cyclic alkyl group having from about 1 to about 10 carbon atoms, or halide;

$R^3$ is H, $C_nH_{2n+1}$, $C_nH_{2n-1}$, $C_mH_{2m}-CH(O)CH_2$, $[CH_2CH_2O]_iR^4$, $[CH_2CH(CH_3)O]_iR^4$, $[C_mH_{2m}]N(R^4)_2$;

n is 8 to about 40;
m is 1 to about 40;

each $R^4$ is independently H, $CH_2OH$ or $C_jH_{2j+1}$;

i is 1 to about 200; and
j is 0 to about 40;

provided that 1) the repeating unit I, $[R_f-X-Y-C(O)-CZ-CH_2]_a-$, is present at a minimum of about 25% by weight of the polymer;

2) repeating units I and II ($[R_f-X-Y-C(O)-CZ-CH_2]_a$ and $[R_f-X-Y-C(O)-CH-CH_2]_b$) are present at a minimum combined total of about 30% by weight of the polymer; and 3) the total of all repeating units, I-VII plus any optional monomers equals 100% by weight of the polymer.

The invention further provides a coating composition comprising the fluoropolymer composition and a method for treating a substrate comprising contacting the substrate with the coating composition.

DETAILED DESCRIPTION

All trademarks are denoted herein by capitalization. In all instances herein, the term "(meth)acrylate" is used to denote either or both acrylate or methacrylate.

The present invention provides a fluoropolymer composition comprising a fluoropolymer and a solvent wherein the fluoropolymer is a fluoroalkyl(meth)acrylate copolymer. The fluoropolymer comprises repeating units I-VII as set forth herein, in any sequence. The fluoropolymer may be a random copolymer, statistical copolymer, block copolymer, multi-block copolymer, gradient copolymer, or alternating copolymer. The fluoropolymer comprises repeating units in any sequence of the following:

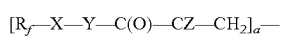  I:

$[R_f—X—Y—C(O)—CH—CH_2]_b—$  II:

$[R^1—O—C(O)—C(CH_3)—CH_2]_c—$  III:

$[R^1—O—C(O)—CH—CH_2]_d—$  IV:

$[R^2—O—C(O)—CH—CH_2]_e—$  V:

$[R^2—O—C(O)—C(CH_3)—CH_2]_g—$  VI:

$[R^3—Y—C(O)—CT-CH_2]_h—$  VII:

wherein $R_f$ is a straight or branched perfluoroalkyl group having 2-6 carbon atoms, which is optionally interrupted by at least one oxygen atom, or a mixture thereof of two or more thereof;

X is an organic divalent linking group having from about 1 to about 20 carbon atoms, optionally containing a triazole, oxygen, nitrogen, or sulfur, or a combination thereof;

Y is O, S or N(R) wherein R is H or $C_1$ to $C_{20}$ alkyl;

Z is a straight or branched alkyl group having from about 1 to about 4 carbon atoms, or halide;

$R^1$ is a straight or branched alkyl group having from 12 to 22 carbon atoms;

$R^2$ is an alkyl group having a chain length of from 1 to 6 carbon atoms, which carbon chain may branched;

a is a positive integer;
b is zero or a positive integer;
c is a positive integer;
d is zero or a positive integer;
e is zero or a positive integer;
g is a positive integer;
h is zero or a positive integer;
T is H, a straight, branched or cyclic alkyl group having from about 1 to about 10 carbon atoms, or halide;
$R^3$ is H, $C_nH_{2n+1}$, $C_nH_{2n-1}$, $C_mH_{2m}—CH(O)CH_2$, $[CH_2CH_2O]_iR^4$, $[CH_2CH(CH_3)O]_iR^4$, $[C_mH_{2m}]N(R^4)_2$;
n is 8 to about 40;
m is 1 to about 40;
each $R^4$ is independently H, $CH_2OH$ or $C_jH_{2j+1}$;
i is 1 to about 200; and
j is 0 to about 40;

provided that 1) the repeating unit I, $[R_f—X—Y—C(O)—CZ—CH_2]_a—$, is present at a minimum of about 25% by weight of the polymer;

2) repeating units I and II ($[R_f—X—Y—C(O)—CZ—CH_2]_a$ and $[R_f—X—Y—C(O)—CH—CH_2]_b$) are present at a minimum combined total of about 30% by weight of the polymer; and 3) the total of all repeating units, I-VII plus any optional monomers equals 100% by weight of the polymer.

In units I and II, $R_f$ is a straight or branched perfluoroalkyl group having 2-6 carbon atoms, which is optionally interrupted by at least one oxygen atom, or a mixture of two or more thereof. Preferably $R_f$ is $C_6F_{13}$— and is a straight or branched alkyl, or a combination thereof.

The subscripts a, c, and g are each independently a positive integer, preferably from 1 to about 10,000, more preferably from about 5 to about 2000. The subscripts b, d, e and h are each independently zero or a positive integer, preferably from 0 to about 10,000, more preferably from about 0 to about 2000.

Examples of suitable linking groups X in units I and II, include straight chain, branched chain or cyclic structures of alkylene, arylene, aralkylene, sulfonyl, sulfoxy, sulfonamido, carbonamido, carbonyloxy, urethanylene, ureylene, and combinations of such linking groups such as sulfonamidoalkylene.

Examples of groups Y in units I, II and VII are O, S or N(R) wherein R is H or $C_1$ to $C_{20}$ alkyl. Preferably R is H or $C_1$ to $C_4$ alkyl.

Z is a straight or branched chain alkyl group having from 1 to 4 carbon atoms or Z is a halide. Useful halides or fluoride, chloride and iodide.

Fluorinated (meth)acrylate monomers suitable for use in this invention to provide unit I have the general formula $R_f—X—Y—C(O)—C(Z)=CH_2$, wherein $R_f$, X, Y and Z are defined herein. Similarly, fluorinated (meth)acrylate monomers suitable for use in this invention to provide unit II have the general formula $R_f—X—Y—C(O)—CH)=CH_2$, wherein $R_f$, X, and Y are defined herein.

$R^1$ is a straight or branched alkyl group having from 12 to 22 carbon atoms. Preferably $R^1$ is stearyl(octadecyl), $CH_3(CH_2)_{17}$. Specific alkyl (meth)acrylate monomers useful to provide units III and IV include stearyl(meth)acrylate, tridecyl(meth)acrylate, and lauryl(meth)acrylate, wherein stearyl (meth)acrylate is preferred.

$R^2$ is an alkyl group having a chain length of from 1 to 6 carbon atoms, which carbon chain may branched. Preferably $R^2$ is 2-ethylhexyl, $CH_3(CH_2)_3CH(C_2H_5)CH_2$. Specific alkyl (meth)acrylate monomers useful to provide units V and VI include 2-ethylhexyl(meth)acrylate, cyclohexyl (meth)acrylate and hexyl(meth)acrylate, preferably 2-ethylhexyl (meth) acrylate.

Nonfluorinated (meth)acrylate monomers suitable for the use in the present invention to provide unit VII include one or more alkyl (meth)acrylates wherein the alkyl group, $R^3$, for each alkyl(meth)acrylate is independently a straight or branched chain containing 8 to 40 carbon atoms. Two or more alkyl(meth)acrylates can be used. Preferably the alkyl group in the alkyl(meth)acrylate contains 8 to 20 carbon atoms. The alkyl(meth)acrylate can be linear or branched. Examples of suitable alkyl (meth)acrylates include, but are not limited to, alkyl(meth)acrylates wherein the alkyl group is octyl, 2-ethylhexyl, decyl, isodecyl, lauryl, cetyl, or stearyl. Preferred alkyl(meth)acrylates to provide unit VII are 2-ethylhexyl acrylate, lauryl acrylate and stearyl acrylate.

Other nonfluorinated (meth)acrylate monomers suitable for the use in the present invention to provide unit VII include one or more of the following: N-methylol (meth)acrylates, hydroxyalkyl(meth)acrylates, alkyloxy(meth)acrylates, glycidyl(meth)acrylates, stearyl acrylate, aminoalkyl methacrylate hydrochloride, acrylamide, and alkyl acrylamide. N-Methylol monomers include, but are not limited to N-methylolacrylamide and N-methylolmethacrylamide. Suitable hydroxyalkyl(meth)acrylates have alkyl chain lengths of 2 to 4 carbon atoms, and include 2-hydroxyethyl acrylate and 2-hydroxyethyl methacrylate. Suitable alkyloxy (meth)acrylates have alkyl chain lengths of 2 to 4 carbon atoms, and contain between 1 and 12 oxyalkylene units per molecule, preferably between 4 and 10 oxyalkylene units per molecule, and most preferably between 6 and 8 oxyalkylene units per molecule.

Suitable optional monomers for use in the preparation of the fluoropolymer described herein include vinyl acetate, vinyl stearate, alkyl vinyl sulfone, styrene, vinyl benzoic acid, alkyl vinyl ether, maleic anhydride, vinyl chloride, and olefins.

The fluoropolymers in the present invention are prepared by polymerization of the fluorinated and nonfluorinated (meth)acrylate monomers. The polymerization process comprises contacting the fluorinated and non-fluorinated (meth)

acrylate monomers as defined hereinabove in an organic solvent in the presence of a free radical initiator and optionally other monomers in an inert atmosphere. For example, the monomers can be mixed in a suitable reaction vessel equipped with an agitation device. A heating source and a cooling source are provided as necessary. In a typical process, the fluorinated and nonfluorinated monomers are combined with the solvent to provide a reaction mixture and the reaction mixture is heated to an appropriate temperature, e.g. 70° C. Temperatures in the range of 20-90° C. may be suitable, depending, for example, on the choice of organic solvent and the choice of free radical initiator. The free radical initiator is typically added after the reaction mixture has reached the appropriate temperature.

Suitable free radical initiators include organic peroxides and azo compounds. Examples of particularly useful organic peroxides are benzoyl peroxide, t-butyl peroxide, acetyl peroxide, and lauryl peroxide. Examples of particularly useful azo compounds include 2,2'-azobis(2-amidinopropane dihydrochloride, 2,2'-azobis(isobutyramidine) dihydrochloride, and azodiisobutylronitrile. Azo initiators are commercially available from E. I. du Pont de Nemours and Company, Wilmington, Del., under the name of "VAZO".

The free radical initiator is generally added over a period of time after the reaction monomers have dissolved in the solvent and/or after the reaction mixture is at the desired temperature. The radical initiator is added in an effective amount. By an "effective amount" of a radical initiator is meant an amount sufficient to initiate the reaction between the monomers and preferably to sustain the reaction for a sufficient period of time to maximize yield of the polymer product. An effective amount of initiator will vary with the exact composition and reaction conditions used. An effective amount of initiator for a given set of conditions is easily determined experimentally by one skilled in the art.

The process to prepare the fluoropolymer may further comprise adding a polymerization regulator (also referred to as a chain transfer agent) to the reaction mixture. The polymerization regulator may be incorporated into the fluoropolymer. A polymerization regulator may be added for the purpose of limiting the molecular weight of the fluoropolymer. Examples of suitable polymerization regulators include acetic acid, acetone, n-butyl alcohol, chloroform, di-n-butyl disulfide, carbon tetrachloride, carbon tetrabromide, triethylamine, n-butyl mercaptan, dodecylmercaptan. Preferably, when a polymerization regulator is used, the polymerization regulator is dodecylmercaptan.

Suitable organic solvents useful in the preparation of the fluoropolymer include methyl isobutyl ketone, butyl acetate, tetrahydrofuran, acetone, isopropanol, ethyl acetate, methylene chloride, chloroform, carbon tetrachloride, cyclohexane, hexane, dioxane, hexafluoroisopropanol, and mixtures of two or more thereof. Cyclohexane or methyl isobutyl ketone is preferred.

The product of the polymerization process is a fluoropolymer in an organic solvent, more particularly a fluorinated (meth)acrylate copolymer comprising repeating units in any sequence of the following:

[R$_f$—X—Y—C(O)—CZ—CH$_2$]$_a$—      I:

[R$_f$—X—Y—C(O)—CH—CH$_2$]$_b$—      II:

[R$^1$—O—C(O)—C(CH$_3$)—CH$_2$]$_c$—      III:

[R$^1$—O—C(O)—CH—CH$_2$]$_d$—      IV:

[R$^2$—O—C(O)—CH—CH$_2$]$_e$—      V:

[R$^2$—O—C(O)—C(CH$_3$)—CH$_2$]$_g$—      VI:

[R$^3$—Y—C(O)—CT-CH$_2$]$_h$—      VII:

wherein

R$_f$ is a straight or branched perfluoroalkyl group having 2-6 carbon atoms, which is optionally interrupted by at least one oxygen atom, or a mixture of two or more thereof;

X is an organic divalent linking group having from about 1 to about 20 carbon atoms, optionally containing a triazole, oxygen, nitrogen, or sulfur, or a combination thereof;

Y is O, S or N(R) wherein R is H or C$_1$ to C$_{20}$ alkyl;

Z is a straight or branched alkyl group having from about 1 to about 4 carbon atoms, or halide;

R$^1$ is a straight or branched alkyl group having from 12 to 22 carbon atoms;

R$^2$ is an alkyl group having a chain length of from 1 to 6 carbon atoms, which carbon chain may branched;

a is a positive integer;

b is zero or a positive integer;

c is a positive integer;

d is zero or a positive integer;

e is zero or a positive integer;

g is a positive integer;

h is zero or a positive integer;

T is H, a straight, branched or cyclic alkyl group having from about 1 to about 10 carbon atoms, or halide;

R$^3$ is H, C$_n$H$_{2n-1}$, C$_n$H$_{2n-1}$, C$_m$H$_{2m}$—CH(O)CH$_2$, [CH$_2$CH$_2$O]$_i$R$^4$, [CH$_2$CH(CH$_3$)O]$_i$R$^4$, [C$_m$H$_{2m}$]N(R$^4$)$_2$;

n is 8 to about 40;

m is 1 to about 40;

each R$^4$ is independently H, CH$_2$OH or C$_j$H$_{2j+1}$;

i is 1 to about 200; and j is 0 to about 40;

provided that 1) the repeating unit I, [R$_f$—X—Y—C(O)—CZ—CH$_2$]$_a$—, is present at a minimum of about 25% by weight of the polymer;

2) repeating units I and II ([R$_f$—X—Y—C(O)—CZ—CH$_2$]$_a$ and [R$_f$—X—Y—C(O)—CH—CH$_2$]$_b$) are present at a minimum combined total of about 30% by weight of the polymer; and 3) the total of all repeating units, I-VII plus any optional monomers equals 100% by weight of the polymer.

The fluoropolymer composition produced as described above may be used directly in a coating composition or added solvent (the "application solvent") may be added to achieve a desirable solids content. recovered, e.g., by filtering and distilling off the solvent. The application solvent is typically a solvent selected from the group consisting of alcohols and ketones.

The fluoropolymer composition is useful as a coating additive, wherein the fluoropolymer composition can be added to a coating base, which is applied to a substrate. Thus, the present invention provides a coating composition comprising a fluoropolymer, an organic solvent and a coating base, optionally further comprising one or more of an application solvent, wherein the fluoropolymer comprises repeating units in any sequence of the following:

[R$_f$—X—Y—C(O)—CZ—CH$_2$]$_a$—      I:

[R$_f$—X—Y—C(O)—CH—CH$_2$]$_b$—      II:

[R$^1$—O—C(O)—C(CH$_3$)—CH$_2$]$_c$—      III:

[R$^1$—O—C(O)—CH—CH$_2$]$_d$—      IV:

$[R^2-O-C(O)-CH-CH_2]_e-$     V:

$[R^2-O-C(O)-C(CH_3)-CH_2]_g-$     VI:

$[R^3-Y-C(O)-CT-CH_2]_h-$     VII:

wherein $R_f$ is a straight or branched perfluoroalkyl group having 2-6 carbon atoms, which is optionally interrupted by at least one oxygen atom, or a mixture of two or more thereof;

X is an organic divalent linking group having from about 1 to about 20 carbon atoms, optionally containing a triazole, oxygen, nitrogen, or sulfur, or a combination thereof;

Y is O, S or N(R) wherein R is H or $C_1$ to $C_{20}$ alkyl;

Z is a straight or branched alkyl group having from about 1 to about 4 carbon atoms, or halide;

$R^1$ is a straight or branched alkyl group having from 12 to 22 carbon atoms;

$R^2$ is an alkyl group having a chain length of from 1 to 6 carbon atoms, which carbon chain may branched;

a is a positive integer;

b is zero or a positive integer;

c is a positive integer;

d is zero or a positive integer;

e is zero or a positive integer;

g is a positive integer;

h is zero or a positive integer;

T is H, a straight, branched or cyclic alkyl group having from about 1 to about 10 carbon atoms, or halide;

$R^3$ is H, $C_nH_{2n+1}$, $C_nH_{2n-1}$, $C_mH_{2m}-CH(O)CH_2$, $[CH_2CH_2O]_iR^4$, $[CH_2CH(CH_3)O]_iR^4$, $[C_mH_{2m}]N(R^4)_2$;

n is 8 to about 40;

m is 1 to about 40;

each $R^4$ is independently H, $CH_2OH$ or $C_jH_{2j+1}$;

i is 1 to about 200; and j is 0 to about 40;

provided that 1) the repeating unit I, $[R_f-X-Y-C(O)-CZ-CH_2]_a-$, is present at a minimum of about 25% by weight of the polymer;

2) repeating units I and II ($[R_f-X-Y-C(O)-CZ-CH_2]_a$ and $[R_f-X-Y-C(O)-CH-CH_2]_b$) are present at a minimum combined total of about 30% by weight of the polymer; and 3) the total of all repeating units, I-VII plus any optional monomers equals 100% by weight of the polymer.

As used herein, the term "coating base" is a composition, typically a solvent-based paint that is applied to a substrate for the purpose of creating a lasting film on the substrate surface. The coating base may be selected from the group consisting of an alkyd coating, a Type I urethane coating, and an unsaturated polyester coating. These coating bases include paints, stains, and similar coatings.

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate.

The present invention further provides a method for treating a substrate comprising contacting the substrate with a coating composition comprising a fluoropolymer composition, which comprises a fluoropolymer and an organic solvent, and a coating base wherein the fluoropolymer, organic solvent and coating base are described hereinabove and wherein the method comprises contacting the substrate with the coating composition and drying or curing the coating composition on the substrate. The method of this invention imparts improved oil repellency, water repellency, cleanability to the substrate. Any method of contacting a coating composition with a substrate can be used. Such methods are well known to a person skilled in the art, such as by brush, spray, roller, doctor blade, wipe, dip, foam, liquid injection, immersion or casting.

By the term "alkyd coating" as used herein is meant a liquid coating based on alkyd resins, typically a paint, clear coating, or stain. The alkyd resins are complex branched and cross-linked polyesters containing unsaturated aliphatic acid residues. Alkyd coatings use, as the binder or film-forming component, a curing or drying alkyd resin. Alkyd resins contain unsaturated aliphatic acid residues derived from drying oils. These resins spontaneously polymerize in the presence of oxygen or air to yield a solid protective film. The polymerization is termed "drying" or "curing" and occurs as a result of autoxidation of the unsaturated carbon-carbon bonds in the aliphatic acid component by atmospheric oxygen. When applied to a surface as a thin liquid layer of a formulated alkyd coating, the cured films that form are relatively hard, non-melting, and substantially insoluble in many organic solvents that act as solvents or thinners for the unoxidized alkyd resin or drying oil.

By the term "urethane coating" as used hereinafter is meant a liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D-1 into five categories. Type I urethane coatings contain a pre-reacted autoxidizable binder. These are also known as uralkyds, urethane-modified alkyds, oil-modified urethanes, urethane oils, or urethane alkyds. Type I urethane coatings are the largest volume category of polyurethane coatings and include paints, clear coatings, or stains. The cured coating for a Type I urethane coating is formed by air oxidation and polymerization of the unsaturated drying oil residue in the binder.

By the term "unsaturated polyester coating" as used hereinafter is meant a liquid coating based on unsaturated polyester resins, dissolved in monomers and containing initiators and catalysts as needed, typically as a paint, clear coating, or gel coat formulation. Unsaturated polyester resins contain as the unsaturated prepolymer, the product obtained from the condensation polymerization of a glycol such as 1,2-propylene glycol or 1,3-butylene glycol with an unsaturated acid such as maleic acid in the acid or anhydride form or a saturated acid such as phthalic acid in the acid or anhydride form. The unsaturated prepolymer is a linear polymer containing unsaturation in the chain. This is dissolved in a suitable monomer, for instance styrene, to produce the final resin. The film is produced by copolymerization of the linear polymer and monomer by means of a free radical mechanism. The free radicals can be generated by heat, or more usually by addition of a peroxide, such as benzoyl peroxide, separately packaged and added before use. Such coating compositions are frequently termed "gel coat" finishes. For curing coatings at room temperature, the decomposition of peroxides into free radicals is catalyzed by certain metal ions, usually cobalt. The solutions of peroxide and cobalt compound are added separately to the mix and well stirred before application. The unsaturated polyester resins that cure by a free radical mechanism are also suited to irradiation curing using, for instance, ultraviolet light. This form of cure, in which no heat is produced, is particularly suited to films on wood or board. Other radiation sources, for instance electron-beam curing, may also be used.

The present invention further provides a coated substrate wherein the substrate comprises a dried coating produced from the coating composition of the invention. By the term "dried coating" as used herein is meant the final decorative and/or protective film obtained after the coating composition has dried, set or cured. Such a final film can be achieved by, for example, air curing, polymerizing, or energy curing.

When used as an additive to a coating base, the fluoropolymer composition as described herein is effectively introduced to the coating base by thoroughly contacting, e.g., by mixing the fluoropolymer composition with the coating base. The contacting of fluoropolymer and coating base can be performed, for example and conveniently, at ambient temperature. More elaborate contacting or mixing methods can be employed such as using a mechanical shaker or providing heat. Such methods are generally not necessary and generally do not substantially improve the final coating composition.

When used as an additive to a coating base, which is a solvent-based paint, the fluoropolymer composition of the invention is generally added at about 0.001 weight % to about 1 weight % on a dry weight basis of the fluoropolymer to the weight of the wet paint. Preferably about from about 0.01 weight % to about 0.5 weight %, and more preferably from about 0.05 weight % to about 0.25 weight % of the fluoropolymer is added to the paint.

In methods of the present invention, the fluoropolymer compositions of this invention have been used as coating additives and applied to substrates to provide superior surface effects such as desirably uniform spreading of the coating composition comprising the fluoropolymer, cleanability of the coated substrate, and increased contact angle of the coated substrate. The uniform spread characteristics reduce the amount of fluoropolymer needed to coat the treated substrate surface with a very thin coating film.

Furthermore, the fluoropolymer as described herein, which contains short perfluoroalkyl chains, has a relatively low molecular weight, that is, a weight-average molar mass (Mw) of between 3,000 and 100,000, in contrast to the molar mass of copolymers derived from longer perfluoroalkyl chains which provide cleanability effects. Therefore, the amount by weight percent of the fluoropolymer of this invention that is needed for desired effects is less than the amount needed for similar effects provided by fluoropolymers having longer perfluoroalkyl chains, when both are used as the coating additives. Since perfluoroalkyl materials are expensive, reducing the fluorine content can reduce the cost. Reduction of the fluorine content with delivery of the same or higher performance is therefore achieved in the present invention. The composition of the present invention is particularly suitable for use as additives to exterior coating and paints.

EXAMPLES

Test Methods

Method 1—Contact Angle Measurement

Contact angles are measured by the Sessile prop Method, which is described by A. W. Adamson in *The Physical Chemistry of Surfaces*, Fifth Edition, Wiley & Sons, New York, N.Y., 1990. Additional information on the equipment and procedure for measuring contact angles is provided by R. H. Dettre et al. in "Wettability", Ed. by J. C. Berg, Marcel Dekker, New York, N.Y., 1993.

In the Sessile prop Method, a Ramé-Hart optical bench (available from Ramé-Hart Inc., 43 Bloomfield Ave., Mountain Lakes, N.J.) is used to hold the substrate in the horizontal position. The contact angle is measured at a prescribed temperature with a telescoping goniometer from the same manufacturer. A drop of test liquid is placed on a surface and the tangent is precisely determined at the point of contact between the drop and the surface. An advancing angle is determined by increasing the size of the drop of liquid and a receding angle is determined by decreasing the size of the drop of liquid. The data are presented typically as advancing and receding contact angles.

Method 2—Leneta Oil Stain Test

The test method described herein is a modification of ASTM 3450-00—Standard Test Method for Washability Properties of Interior Architectural Coatings, which is hereby specifically incorporated by reference.

Drawdowns were prepared by applying a coat of coating composition on Leneta Black MYLAR cards (The Leneta Company, Mahwah, N.J.) using a BYK-Gardner automatic drawdown machine (BYK-Gardner, Silver Spring, Md.) and a 5 mil (0.127 mm) Bird applicator drawdown blade (BYK-Gardner, Silver Spring, Md.). The drawdown speed was set to be slow enough to prevent pinholes or holidays in the resulting coating. Several drawdowns were prepared for each paint and additive combination. The coated cards were allowed to dry for seven days for testing for cleanability.

Staining media were prepared using VASELINE NURSERY petroleum jelly (Marietta Corporation, Cortland, N.Y.) and Leneta Carbon Black Dispersion in Mineral Oil (ST-1) (The Leneta Company, Mahwah, N.J.). The petroleum jelly was melted in a clean glass container for 30 minutes in an oven set at 70° C. Then the petroleum jelly was mixed with 5% of its weight of Leneta Carbon Black. For instance, 95 g of petroleum jelly was mixed with 5 g of Leneta Carbon Black to produce 100 g of staining media. The mixed staining media was cooled for several hours in a refrigerator at 4° C.

Cleaning media were prepared using a JOY ULTRA CONCENTRATED COUNTRY LEMON dishwashing liquid (The Procter & Gamble Company, Cincinnati, Ohio). Dishwashing liquid was mixed with deionized water at a ratio of 1 g of dishwashing liquid for every 99 g of water.

Each drawdown was stained in the same manner. A staining template was prepared from a MYLAR Leneta card by cutting out a 3" by 1" (7.6 cm by 2.5 cm) strip from the interior of the card. The template was placed over a coated drawdown card to be stained. Staining media was spread over the drawdown card and the template using a spatula so that none of the drawdown card remained visible. Excess stain was removed with a spatula. Stained cards were allowed to set and dry for 60 minutes.

In preparation for cleaning, scrap MYLAR was used to gently scrape the excess dried stain from the stained section of the card, both the washed and unwashed sections. Similarly a v-folded clean paper towel was used to remove unset stain from the entire card, both the washed and unwashed sections. The card was then securely attached to a BYK-Gardner Abrasion tester (BYK-Gardner, Silver Spring, Md.) or other method. A piece of cheesecloth (VWR International, San Diego, Calif.) was attached to the cleaning block on the abrasion tester. The cheesecloth was folded and attached so that the contacting surface was 8 layers thick. 10 mL of cleaning solution prepared as specified above was applied to the contacting surface of the cheesecloth. The abrasion tester was run through 5 cycles (10 wipes) over a stained section of the drawdown card that is henceforth designated as stained and cleaned. Excess cleaning solution was rinsed away with deionized water for a few seconds and then allowed to dry for 2 hours or until completely dry by visible inspection. One section of each stained drawdown card was cleaned in this manner.

Cleanability was determined by evaluating the stained and washed painted portion of the drawdown card in comparison to both the unstained and painted portion of the card and the stained and unwashed painted portion of the card. A Hunter-Lab ULTRASCAN Pro colorimeter (Hunter Associates Laboratory, Inc, Reston, Va.) was used to take three different measurements for each designated painted portion of the drawdown card: stained and washed, unstained, and stained and unwashed. The measurements were averaged to obtain a mean value for that section that is used to evaluate the cleanability rating for that card as described below. The colorimeter was set to read the L*function and the aperture was no larger than ¾ of an inch (1.9 cm).

A cleanability score was calculated ranging from 0-10 wherein 0 is uncleanable, and 10 is completely cleanable. Values 1-9 were established in numerical order equidistant from 0, 10, and one another on a linear slope. The above description fits the following equation: [(mean L*value of stained and washed painted section)−(mean L*value of stained and unwashed painted section)]/[(mean L*value of unstained painted section)−(mean L*value of stained and unwashed painted section)]*10=cleanability rating.

Example 1

4-methyl-2-pentanone ("MIBK", 90 g), 2-propenoic acid, 2-methyl-, 3,3,4,4,5,5,6,6,7,7,8,8,8-tridecafluorooctyl ester (18.36 g), poly(oxy-1,2-ethanediyl), α-(2-methyl-1-oxo-2-propenyl)-ω-hydroxy-(0.51 g), 2-propenoic acid, 2-methyl-, octadecyl ester (4.09 g), 2-propenamide, N-(hydroxymethyl)-(1.4 g), 2-propenoic acid, 2-methyl-, 2-hydroxyethyl ester (0.17 g), 2-methyl-2-propenoic acid, 2-ethylhexyl ester (25.81 g) and 1-dodecanethiol (0.18 g) were charged to a 250-mL, 4-neck round-bottom flask equipped with a condenser, overhead stirrer and nitrogen sparge. The mixture was sparged with nitrogen while being heated to 70° C. After the reaction mixture reached 70° C., nitrogen sparging was ceased and a nitrogen blanket was introduced. A solution of 2,2'-azobis(2-methylbutyronitrile) (VAZO 67) in MIBK was then added (0.145 g VAZO 67 in 1.00 g MIBK), followed by a second addition (0.097 g of VAZO 67 in 1.00 g of MIBK) after 1 hour and a final addition after 3 hours (0.097 g Vazo 67 in 1.00 g MIBK). The solution was then allowed to stir at 70° C. for an additional 12 hours, producing a fluoropolymer mixture. After cooling to room temperature, the fluoropolymer mixture was filtered through a milk filter and percent solids were measured (crude solids=35%). The final product was diluted to 30% solids with MIBK.

Example 2

The product of Example 1 (Additive A) was dosed into a commercially available semi-gloss alkyd paint at about 0.05% active ingredient by weight of the wet paint and evaluated for the contact angle performance based on Method 1. A blank paint (un-dosed) was evaluated as a control sample. The curing time of the applied paint was 10 days at ambient temperature. The resulted wet paint film thickness was about 100-150 micron, and cured and dry film thickness was about 50-60 micron. Results are provided in Table 1.

TABLE 1

Water and Oil Contact Angle Data on Semi-gloss Alkyd Paint

| Additive | Advancing Water Avg. of 3-6 trials | Advancing Oil Avg. of 3-6 trials |
|---|---|---|
| Blank (Control) | 78.4 | 0.0 |
| 0.05% Additive A | 106.5 | 64.9 |

Example 3

The product of Example 1 (Additive A) was dosed into a commercially available alkyd satin paint at about 0.05% active ingredient by weight of the wet paint and evaluated for the contact angle performance based on Method 1. A blank paint (un-dosed) was evaluated as a control sample. The curing time of the applied paint was 10 days at ambient temperature. The resulted wet paint film thickness was about 100-150 micron, and cured and dry film thickness was about 50-60 micron. Results are provided in Table 2.

TABLE 2

Water and Oil Contact Angle Data on Alkyd Satin Paint

| Additive | Advancing Water Avg. of 3-6 trials | Advancing Oil Avg. of 3-6 trials |
|---|---|---|
| Blank (Control) | 89.2 | 11.7 |
| 0.05% Additive A | 111.4 | 64.3 |

Example 4

The product of Example 1 (Additive A) was dosed into a commercially available high-gloss alkyd paint at about 0.025% active ingredient by weight of the wet paint and evaluated for the contact angle performance according to the Method 1. A blank paint (un-dosed) was evaluated as a control sample. In another sample, in addition to the Additive A, a non-fluorinated paint additive (Additive B) was dosed into the high-gloss alkyd paint at about 0.6% active ingredient. The curing time of the applied paint was 10 days at ambient temperature. The resulted wet paint film thickness was about 120-150 micron, and cured and dry film thickness was about 50-70 micron. Results are provided in Table 3.

TABLE 3

Water and Oil Contact Angle Data on High-gloss Alkyd Paint

| Additive | Advancing Water | Advancing Oil |
|---|---|---|
| Blank (Control) | 95 | 32 |
| 0.025% Additive A | 98 | 40 |
| 0.025% Additive A + 0.6% Additive B | 99 | 39 |

The above samples were also evaluated for the Leneta Oil Stain Test according to Method 2. Results are provided in Table 4.

TABLE 4

Leneta Oil Stain Test on High-gloss Alkyd Paint

| Additive | Rating | Visual |
|---|---|---|
| Blank Control | 7.1 | 9.0 |
| 0.025% Additive A | 8.1 | 10.0 |
| 0.025% Additive A + 0.6% Additive B | 8.9 | 10.0 |

As can be seen from the contact angle data provided in Tables 1-3, the surfaces coated with the fluoropolymer and coating compositions of the invention illustrated significantly improved oil contact angle for both high gloss, satin and semi-gloss alkyd paints at very low use rate (0.025% to 0.05%).

In addition, the Leneta cleanability data, as provided in Table 4, illustrated surfaces coated with the fluoropolymer and coating compositions of the invention have improved cleanability against oily stains which simulates organic soil and dirty finger prints.

What is claimed is:

1. A coating composition comprising a fluoropolymer composition and a coating base, wherein the fluoropolymer composition comprises a fluoropolymer dissolved in an organic solvent and further wherein the fluoropolymer comprises repeating units in any sequence of polymer units:

$(R_f-X-Y-C(O)-CZ-CH_2)_a-$      I:

$(R_f-X-Y-C(O)-CH-CH_2)_b-$      II:

$(R^1-O-C(O)-C(CH_3)-CH_2)_c-$      III:

$(R^1-O-C(O)-CH-CH_2)_d-$      IV:

$(R^2-O-C(O)-CH-CH_2)_e-$      V:

$(R^2-O-C(O)-C(CH_3)-CH_2)_g-$      VI:

$(R^3-Y-C(O)-CT-CH_2)_h-$      VII:

wherein
$R_f$ is $C_6F_{13}-$, and is a straight or branched alkyl, or a combination thereof;
X is an organic divalent linking group having from about 1 to about 20 carbon atoms, optionally containing a triazole, oxygen, nitrogen, or sulfur, or a combination thereof;
Y is O;
Z is a straight or branched alkyl group having from about 1 to about 4 carbon atoms, or halide;
$R^1$ is a straight or branched alkyl group having from 12 to 22 carbon atoms;
$R^2$ is an alkyl group having a chain length of from 1 to 6 carbon atoms, which carbon chain may be branched;
T is H, a straight, branched or cyclic alkyl group having from about 1 to about 10 carbon atoms, or halide;
$R^3$ is H, $(CH_2CH_2O)_iR^4$, or $(CH_2CH(CH_3)O)_iR^4$;
each $R^4$ is independently H or $CH_2OH$;
i is 1 to about 200; and
j is 0 to about 40;
provided that
1) the repeating unit I, $(R_f-X-Y-C(O)-CZ-CH_2)_a-$, is present at a minimum of about 25% by weight of the polymer;

2) repeating units I and II $((R_f-X-Y-C(O)-CZ-CH_2)_a$ and $(R_f-X-Y-C(O)-CH-CH_2)_b)$ are present at a minimum combined total of about 30% by weight of the polymer; and 3) the total of all repeating units, I-VII plus any optional monomers equals 100% by weight of the polymer, wherein the subscripts a, c, and g are each independently from 5 to about 5,000, the subscripts b, e, and d are each independently from 0 to about 2,000, and subscript h is a positive integer up to 2,000;

wherein the organic solvent is methyl isobutyl ketone, butyl acetate, tetrahydrofuran, acetone, isopropanol, ethyl acetate, methylene chloride, chloroform, carbon tetrachloride, cyclohexane, hexane, dioxane, hexafluoroisopropanol, or a mixture of two or more thereof, and wherein the coating base is selected from the group consisting of an alkyd coating, a Type I urethane coating, and an unsaturated polyester coating.

2. The coating composition according to claim 1 wherein $R^1$ is stearyl, $CH_3(CH_2)_{17}$ and $R^2$ is 2-ethylhexyl, $CH_3(CH_2)_3CH(C_2H_5)CH_2$.

3. The coating composition according to claim 1 wherein the organic solvent is cyclohexane or methyl isobutyl ketone.

4. The composition of claim 1 further comprising an application solvent, which is selected from the group consisting of alcohols and ketones.

5. The coating composition according to claim 1 wherein the coating base is a solvent-based paint and the fluoropolymer composition is added to the paint in an amount of 0.001 weight % to about 1 weight % on a dry weight basis of the fluoropolymer to the weight of the wet paint.

6. The coating composition according to claim 5 wherein the fluoropolymer composition is added to the paint in an amount of 0.01 weight % to about 0.5 weight % on a dry weight basis of the fluoropolymer to the weight of the wet paint.

7. The coating composition according to claim 5 wherein the fluoropolymer composition is added to the paint in an amount of 0.05 weight % to about 0.25 weight % on a dry weight basis of the fluoropolymer to the weight of the wet paint.

8. The coating composition of claim 1 wherein $R_f$ is $C_6F_{13}-$, and is a straight or branched alkyl, or a combination thereof; $R^1$ is stearyl, $CH_3(CH_2)_{17}$; $R^2$ is 2-ethylhexyl, $CH_3(CH_2)_3CH(C_2H_5)CH_2$; and the organic solvent is cyclohexane or methyl isobutyl ketone.

9. A method for treating a substrate with a coating composition comprising contacting the substrate with the coating composition and drying or curing the coating composition on the substrate, wherein the coating composition comprises a fluoropolymer composition and a coating base, wherein the fluoropolymer composition comprises a fluoropolymer dissolved in an organic solvent and further wherein the fluoropolymer comprises repeating units in any sequence of polymer units:

$[R_f-X-Y-C(O)-CZ-CH_2]_a-$      I:

$[R_f-X-Y-C(O)-CH-CH_2]_b-$      II:

$[R^1-O-C(O)-C(CH_3)-CH_2]_c-$      III:

$[R^1-O-C(O)-CH-CH_2]_d-$      IV:

$[R^2-O-C(O)-CH-CH_2]_e-$      V:

[R²—O—C(O)—C(CH₃)—CH₂]$_g$— VI:

[R³—Y—C(O)—CT-CH₂]$_h$— VII:

wherein $R_f$ is $C_6F_{13}$—, and is a straight or branched alkyl, or a combination thereof;

X is an organic divalent linking group having from about 1 to about 20 carbon atoms, optionally containing a triazole, oxygen, nitrogen, or sulfur, or a combination thereof;

Y is O;

Z is a straight or branched alkyl group having from about 1 to about 4 carbon atoms, or halide;

$R^1$ is a straight or branched alkyl group having from 12 to 22 carbon atoms;

$R^2$ is an alkyl group having a chain length of from 1 to 6 carbon atoms, which carbon chain may be branched;

T is H, a straight, branched or cyclic alkyl group having from about 1 to about 10 carbon atoms, or halide;

$R^3$ is H, $[CH_2CH_2O]_iR^4$ or $[CH_2CH(CH_3)O]_iR^4$;

each $R^4$ is independently H or $CH_2OH$;

i is 1 to about 200; and j is 0 to about 40;

provided that 1) the repeating unit I, $[R_f—X—Y—C(O)—CZ—CH_2]_a$—, is present at a minimum of about 25% by weight of the polymer;

2) repeating units I and II ($[R_f—X—Y—C(O)—CZ—CH_2]_a$ and $[R_f—X—Y—C(O)—CH—CH_2]_b$) are present at a minimum combined total of about 30% by weight of the polymer; and 3) the total of all repeating units, I-VII plus any optional monomers equals 100% by weight of the polymer;

wherein the subscripts a, c, and g are each independently from 5 to about 5,000, the subscripts b, e, and d are each independently from 0 to about 2,000, and subscript h is a positive integer up to 2,000, wherein the organic solvent is methyl isobutyl ketone, butyl acetate, tetrahydrofuran, acetone, isopropanol, ethyl acetate, methylene chloride, chloroform, carbon tetrachloride, cyclohexane, hexane, dioxane, hexafluoroisopropanol, or a mixture of two or more thereof, and wherein the coating base is selected from the group consisting of an alkyd coating, a Type I urethane coating, and an unsaturated polyester coating.

10. The method according to claim 9 wherein the contacting step is by brush, spray, roller, doctor blade, wipe, dip, foam, liquid injection, immersion or casting.

11. The method according to claim 9 wherein the drying or curing step is performed by air curing, polymerizing, or energy curing.

* * * * *